(12) United States Patent
Shen et al.

(10) Patent No.: US 12,386,016 B2
(45) Date of Patent: Aug. 12, 2025

(54) SYSTEM, METHOD, AND STORAGE MEDIUM FOR DESIGN AND USE REFERENCE EMITTERS TO ENHANCE PASSIVE SINGLE SATELLITE GEOLOCATION OF EMI SOURCES

(71) Applicant: Intelligent Fusion Technology, Inc., Germantown, MD (US)

(72) Inventors: Dan Shen, Germantown, MD (US); Genshe Chen, Germantown, MD (US); Khanh Pham, Kirtland AFB, NM (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 326 days.

(21) Appl. No.: 18/161,014

(22) Filed: Jan. 27, 2023

(65) Prior Publication Data
US 2024/0255604 A1 Aug. 1, 2024

(51) Int. Cl.
*G01S 5/00* (2006.01)
*G01S 5/02* (2010.01)

(52) U.S. Cl.
CPC .......... *G01S 5/0246* (2020.05); *G01S 5/0294* (2013.01)

(58) Field of Classification Search
CPC .............. G01S 5/0246; G01S 5/0294
USPC ...................................... 455/456.1
See application file for complete search history.

(56) References Cited

U.S. PATENT DOCUMENTS

| | | | |
|---|---|---|---|
| 2005/0275582 A1* | 12/2005 | Mohan | G01S 13/003 342/27 |
| 2016/0259041 A1* | 9/2016 | Tan | G01S 13/003 |
| 2016/0327686 A1* | 11/2016 | Martin-Neira | G01W 1/00 |

* cited by examiner

*Primary Examiner* — Michael R Neff
(74) *Attorney, Agent, or Firm* — ANOVA LAW GROUP, PLLC

(57) ABSTRACT

The present disclosure provides a cross-correlation based method, a system and a storage medium for blind electromagnetic interference Doppler estimation from a single satellite geolocation system. The method includes at a first time, calculating a power spectral density (PSD) of a received signal; smoothing the PSD of the received signal using moving window average, and saving the smoothed PSD of the received signal as PSD0; at a next time, calculating a PSD of another received signal; smoothing the PSD of the another received signal using moving window average, and saving the smoothed PSD of the another received signal as PSD1; performing cross correlation between PSD0 and PSD1 to obtain a cross-correlation result; determining a peak position from the cross-correlation result; and obtaining a Doppler estimation based on a peak position shift between the peak position and a reference position.

15 Claims, 18 Drawing Sheets

SYSTEM, METHOD, AND STORAGE MEDIUM FOR DESIGN AND USE REFERENCE EMITTERS TO ENHANCE PASSIVE SINGLE SATELLITE GEOLOCATION OF EMI SOURCES

GOVERNMENT RIGHTS

The present disclosure was made with Government support under Contract No. FA9453-21-P-0567, awarded by the United States Air Force Research Laboratory. The U.S. Government has certain rights in the present disclosure.

FIELD OF THE DISCLOSURE

The present disclosure generally relates to the field of satellite navigation technology and, more particularly, relates to a cross-correlation based method, a system, and a storage medium for blind electromagnetic interference (EMI) Doppler estimation from a single satellite geolocation (SSG) system.

BACKGROUND

Satellite communication is facing increasingly diverse physical and EMI that transmit radio frequency (RF) signals in X/Ku/K/Ka/Q-bands. Interference of satellite communications is a frequent and ongoing concern for both Department of Defense (DoD) and civilian enterprises. Geolocation of the interfering source is an essential step in mitigating or eliminating the interference and restoring the operation of communications service. A key challenge is to obtain accurate 3D space-based geolocation of ground-based EMI sources using a single satellite. Due to the limited power on a satellite and usual clustering environments of EMI sources, passive geolocation is more feasible than active geolocation. Various manners, such as nonlinear least squares, extended Kalman filters, and unscented Kalman filters (UKF), may utilize Doppler information to geolocate EMI or emitters.

BRIEF SUMMARY OF THE DISCLOSURE

One aspect or embodiment of the present disclosure provides a cross-correlation based method for blind EMI Doppler estimation from a SSG system. The method includes at a first time, calculating a power spectral density (PSD) of a received signal; smoothing the PSD of the received signal using moving window average, and saving the smoothed PSD of the received signal as PSD0; at a next time, calculating a PSD of another received signal; smoothing the PSD of the another received signal using moving window average, and saving the smoothed PSD of the another received signal as PSD1; performing cross correlation between PSD0 and PSD1 to obtain a cross-correlation result; determining a peak position from the cross-correlation result; and obtaining a Doppler estimation based on a peak position shift between the peak position and a reference position.

Another aspect or embodiment of the present disclosure provides a system for blind EMI Doppler estimation from a SSG system. The system includes a memory, configured to store program instructions for performing a method for passive SSG of ground-based EMI sources; and a processor, coupled with the memory and, when executing the program instructions, configured for: at a first time, calculating a power spectral density (PSD) of a received signal; smoothing the PSD of the received signal using moving window average, and saving the smoothed PSD of the received signal as PSD0; at a next time, calculating a PSD of another received signal; smoothing the PSD of the another received signal using moving window average, and saving the smoothed PSD of the another received signal as PSD1; performing cross correlation between PSD0 and PSD1 to obtain a cross-correlation result; determining a peak position from the cross-correlation result; and obtaining a Doppler estimation based on a peak position shift between the peak position and a reference position.

Another aspect or embodiment of the present disclosure provides a non-transitory computer-readable storage medium, containing program instructions for, when being executed by a processor, performing a cross-correlation based method for blind EMI Doppler estimation from a SSG system. The method includes at a first time, calculating a power spectral density (PSD) of a received signal; smoothing the PSD of the received signal using moving window average, and saving the smoothed PSD of the received signal as PSD0; at a next time, calculating a PSD of another received signal; smoothing the PSD of the another received signal using moving window average, and saving the smoothed PSD of the another received signal as PSD1; performing cross correlation between PSD0 and PSD1 to obtain a cross-correlation result; determining a peak position from the cross-correlation result; and obtaining a Doppler estimation based on a peak position shift between the peak position and a reference position.

Other aspects or embodiments of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

References are made in detail to exemplary embodiments of present disclosure, which are illustrated in accompanying drawings. Wherever possible, same reference numbers are used throughout accompanying drawings to refer to same or similar parts.

Commanding, controlling, and maintaining the health of satellites requires a clear operating spectrum for communications. Electro Magnetic Interference (EMI) from nearby satellites may interfere with these communications. The very first step to mitigate these EMI effect is to geolocate them. The present disclosure provides a method and a system that provide enhanced reference emitters to satellite geolocation units that otherwise are unable to geolocate potential EMI sources at low Earth orbit (LEO) and/or geostationary orbit (GEO) distances in a real-time fashion.

According to various embodiments of the present disclosure, a cross-correlation based method, a system, and a storage medium for blind EMI Doppler estimation from a SSG system are described hereinafter.

Figure 1:
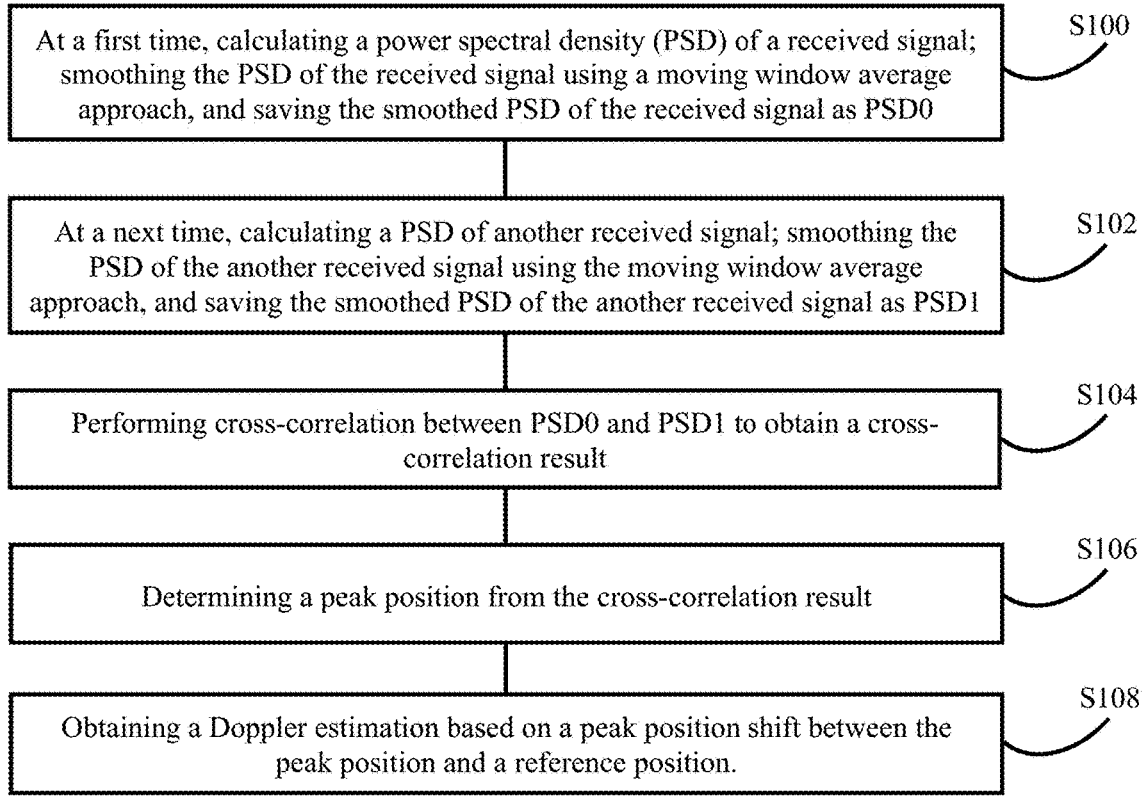
FIG. 1 depicts a flowchart of an exemplary cross-correlation based method for blind EMI Doppler estimation from a SSG system according to various disclosed embodiments of the present disclosure.

FIG. 1 depicts a flowchart of an exemplary cross-correlation based method for blind EMI Doppler estimation from a SSG system according to various disclosed embodiments of the present disclosure. Referring to FIG. 1, the cross-correlation based method may include following exemplary steps.

In S100, at a first time, a power spectral density (PSD) of a received signal is calculated; the PSD of the received signal is smoothed using moving window average, and the smoothed PSD of the received signal is saved as PSD0.

In S102, at a next time, a PSD of another received signal is calculated; the PSD of the another received signal is smoothed using moving window average, and the smoothed PSD of the another received signal is saved as PSD1.

In S104, cross-correlation between PSD0 and PSD1 is performed to obtain a cross-correlation result.

In S106, a peak position is determined from the cross-correlation result.

In S108, a Doppler estimation is obtained based on a peak position shift between the peak position and a reference position.

In one embodiment, Doppler rate estimation is calculated according to the obtained Doppler estimation.

In one embodiment, performing an online ionosphere estimation includes estimating an ionospheric delay for an enhanced reference emitter (ERE); estimating slant total electron content (STEC) using the ionospheric delay for the ERE; and estimating an ionospheric delay for an EMI source using the STEC.

In one embodiment, the ERE has dual operation modes which include an offline mode and an online mode, where the ERE is configured to mimic the EMI source at the offline mode and compensate the ionospheric delay at the online mode.

In one embodiment, before calculating the PSD of the received signal, the method further includes performing fast Fourier transform (FFT) on the received signal; and before calculating the PSD of the another received signal, the method further includes performing fast Fourier transform (FFT) on the another received signal.

Figure 2:
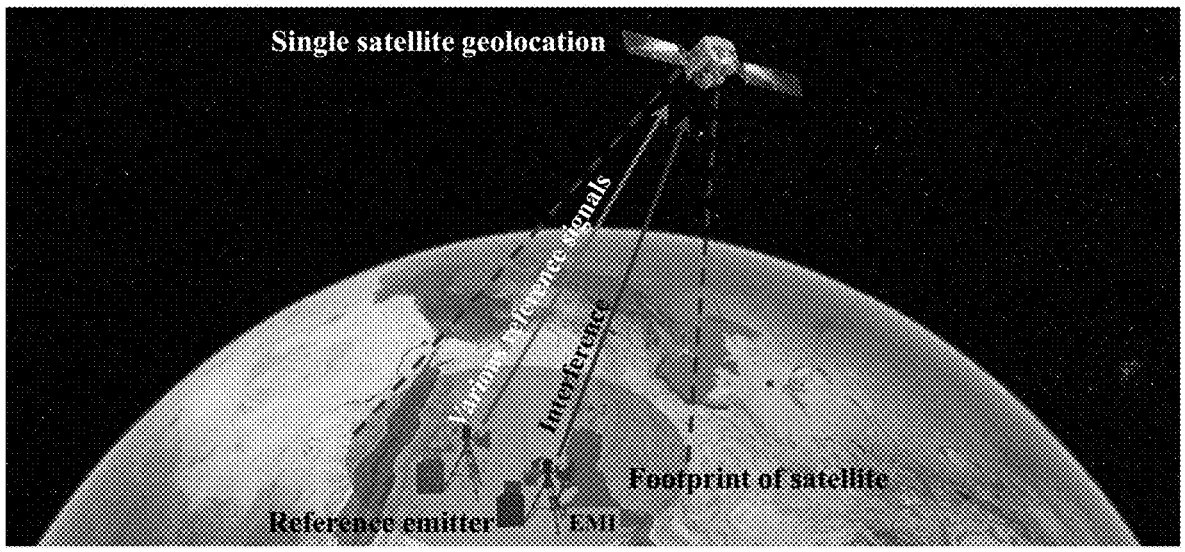
FIG. 2 depicts an exemplary concept of operations (CON-OPS) of an enhanced reference emitter for single satellite geolocation according to various disclosed embodiments of the present disclosure.

FIG. 2 depicts an exemplary concept of operations (CON-OPS) of the enhanced reference emitter for the single satellite geolocation according to various disclosed embodiments of the present disclosure. In the present disclosure, the enhanced reference emitter solution is shown in FIG. 2 to support 3-dimensional (3D) geolocation of ground-based EMI sources.

According to various embodiments of the present disclosure, the reference emitter may mimic EMI to train or tune the SSG system, so that the SSG may adaptively set key parameters for different frequency bands and waveforms of EMI sources, signal-to-noise ratio (SNR) levels, and satellite orbits. The reference emitter may also support trade-off studies of processing time and accuracy of SSG.

In the present disclosure, the enhanced reference signal emitter which significantly improves the ability to geolocate the satellite communications (SATCOM) uplink EMI is provided. Enhanced reference signal capability may support current reference signal data users to meet ongoing satellite real-time ranging and timing requirements. The present disclosure may establish a reference emitter database to reduce transmission ambiguities commonly associated with unstable communication signals outside the direct control of DoD agencies.

Figure 3:
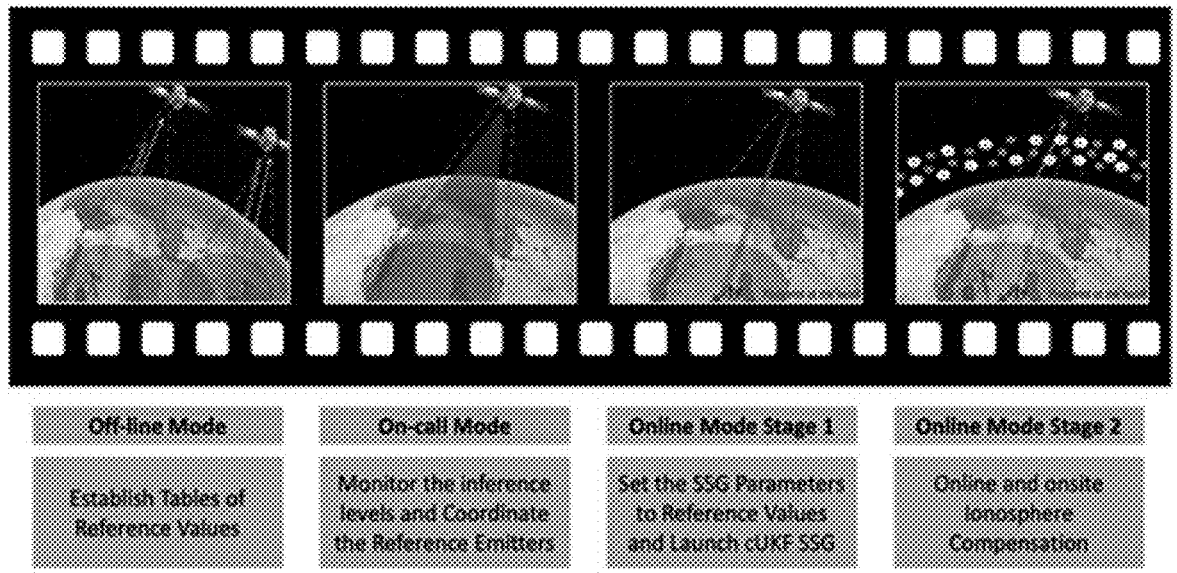
FIG. 3 depicts another exemplary CONOPS of an enhanced reference emitter for single satellite geolocation according to various disclosed embodiments of the present disclosure.

FIG. 3 depicts another exemplary CONOPS of the enhanced reference emitter for the single satellite geolocation according to various disclosed embodiments of the present disclosure. FIG. 2 illustrates a solution framework provided in various embodiments of the present disclosure. The enhanced reference emitter may be portable and software-defined-radio (SDR) based, which may mimic the EMI and mitigate the ionospheric effect. The solution may have following features including portability, flexibility (SDR based), and dual operation modes. The dual operation modes may include an off-line mode which may mimic the EMI to train the SSG and establish reference setting of the SSG parameters and an online mode which may move to same footprint and compensate for the ionospheric effect. The concept of operations of the ERE is illustrated in FIG. 3.

For example, in one embodiment, tables of references may be established at the off-line mode; the interference levels may be monitored, and the reference emitters may be coordinated at the on-call mode; and the online mode may include online mode stage 1 and online mode stage 2. At the online mode stage 1, the SSG parameters may be set to reference values, and cUKF (constrained unscented Kalman filter) for SSG may be launched; and at the online mode stage 2, online and onsite ionosphere compensation may be performed.

Figure 4:
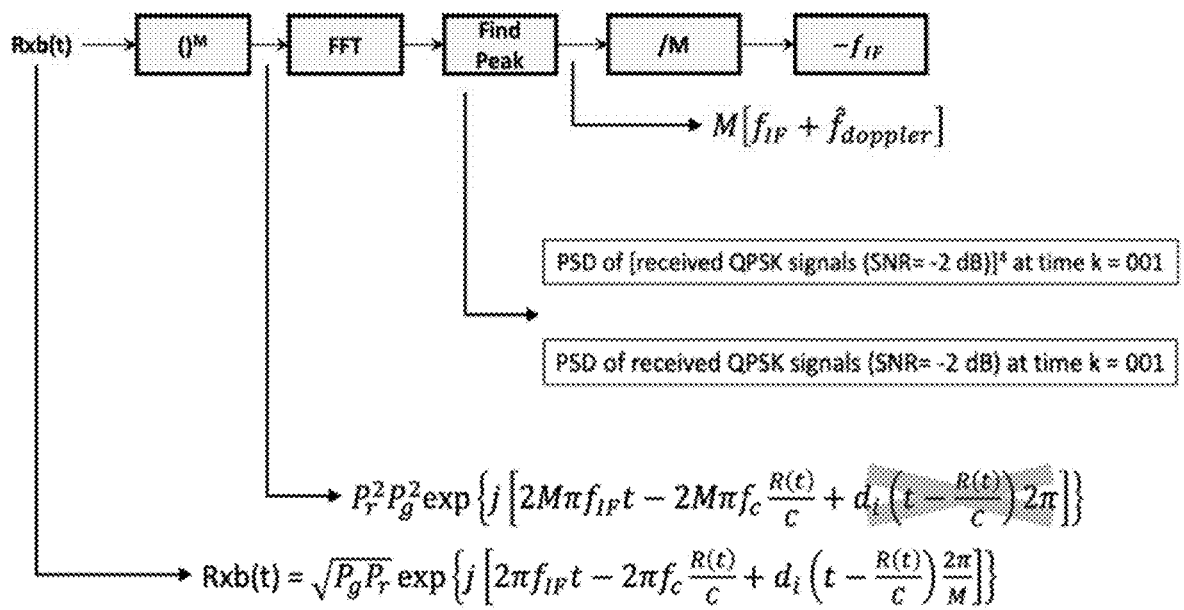
FIG. 4 depicts an exemplary Doppler estimation with priori information according to various disclosed embodiments of the present disclosure.

Doppler estimation with a priori information is described in detail here. It assumes that known carrier frequency is $f_c$, and known M is for the MPSK (M-ary phase-shift keying) demodulation. Since $f_c$ is known, IF (intermediate frequency $f_{IF}=f_c-f_{down\ converter\ freq.}$), denoted by $f_{IF}$, may also be known. FIG. 4 depicts an exemplary Doppler estimation with priori information according to various disclosed embodiments of the present disclosure. The block diagram of Doppler estimation with priori information is illustrated in FIG. 4. The big X sign in FIG. 4 means cancelation; and multiple times of 2pi may have no effects on Cos and Sin functions.

Referring to FIG. 4, five exemplary steps may be used to estimate the Doppler from received baseband signals $R_{xb}(t)$ as the following. 1) The input signals may be raised to the power of M, where effect of transmitted data $d_i(t)$ may be cancelled in this step; 2) then fast Fourier transform (FFT) may be calculated; 3) the peak point on resulting spectrum may be determined; and the peak point may sit at $M[f_{IF}+\hat{f}_{doppler}]$, where $\hat{f}_{doppler}$ is estimated Doppler shift; 4) the peak position may be divided by M, and $f_{IF}+\hat{f}_{doppler}$ may be obtained; and 5) the Doppler estimation may be obtained by subtracting $f_{IF}$ from the result of step 4.

Figure 5:
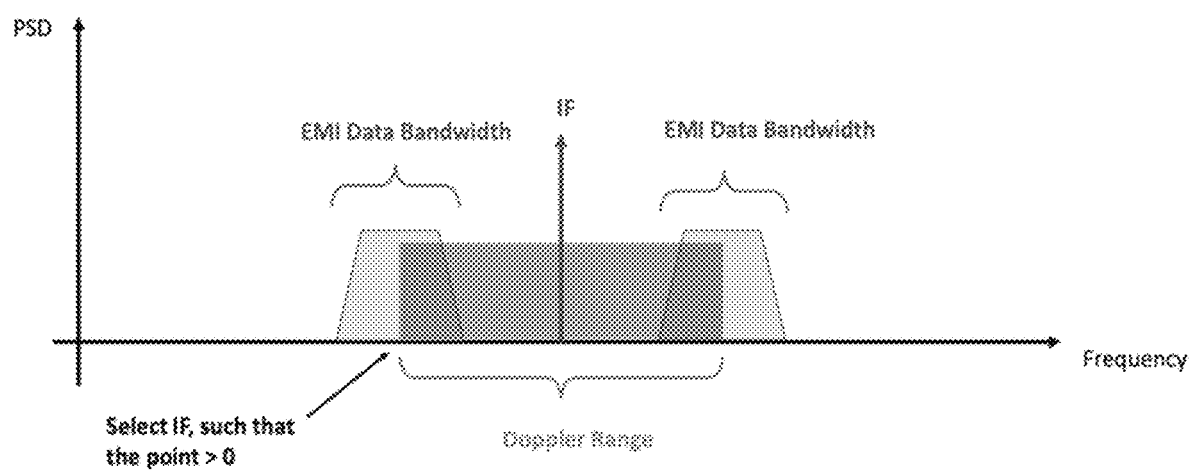
FIG. 5 depicts an exemplary determination of an intermediate frequency (IF) for Doppler estimation according to various disclosed embodiments of the present disclosure.

To ensure the peak of FFT in the FFT windows, the approach in FIG. 5 may be used to pick an appropriate IF. FIG. 5 depicts an exemplary determination of the IF for Doppler estimation according to various disclosed embodiments of the present disclosure. The point mentioned in FIG. 5 may be the IF-half of the doppler range. After the Doppler estimation, the Doppler rate may be estimated using the following equation:

$$\hat{\dot{f}}_{doppler}(t) = \frac{\hat{f}_{doppler}(t+\Delta t) - \hat{f}_{doppler}(t-\Delta t)}{2\Delta t} \quad (1)$$

According to various embodiments of the present disclosure, cross-correlation based method for blind Doppler estimation is described in detail hereinafter.

Figure 6:
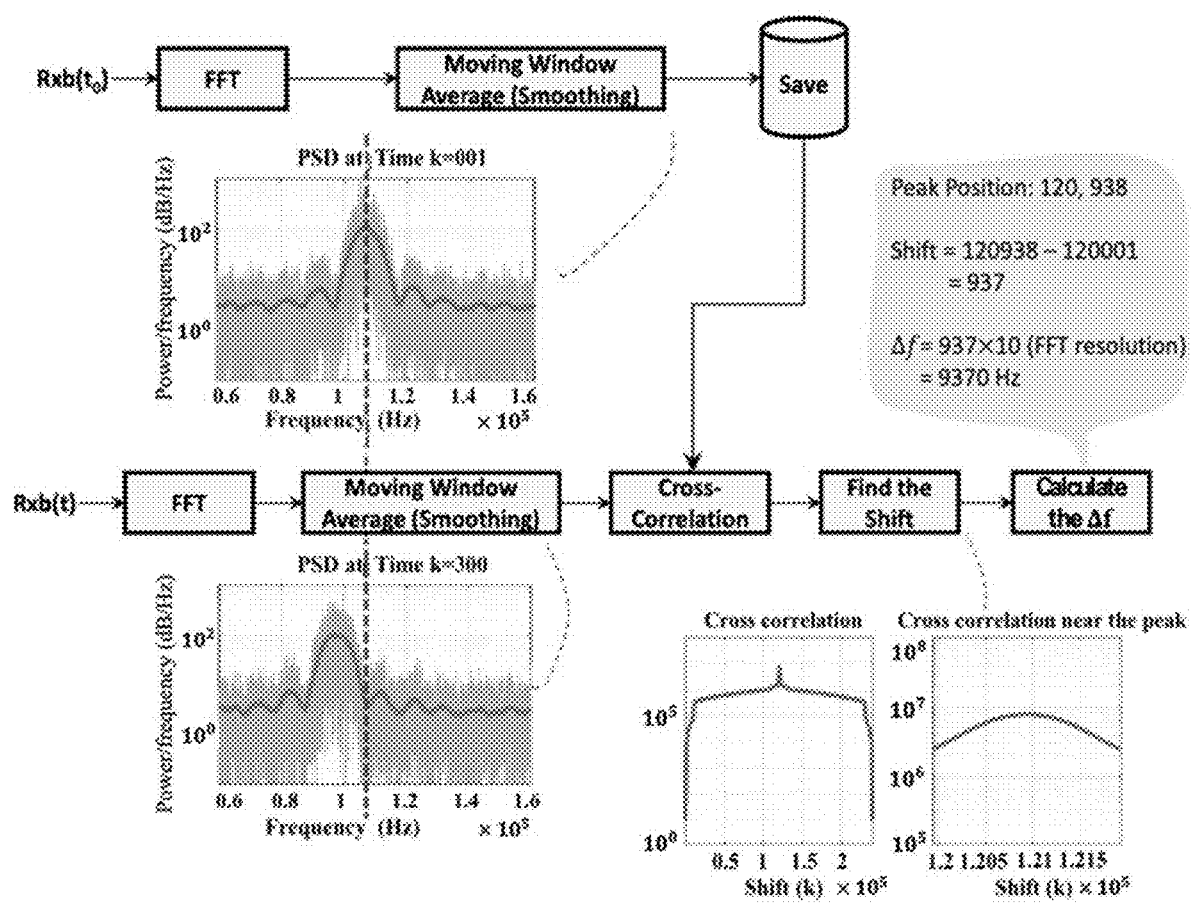
FIG. 6 depicts an exemplary cross-correlation based method for blind estimation of Doppler and Doppler rate according to various disclosed embodiments of the present disclosure.

In the blind detection of Doppler information, the prior information of the carrier and waveform of the EMI sources may be relaxed. FIG. 6 depicts an exemplary cross-correlation based method for blind estimation of Doppler and Doppler rate according to various disclosed embodiments of the present disclosure. At t0, the PSD (power spectral density) may be calculated from a received signal; then the PSD may be smoothed using the moving window average; and the smoothed PSD may be saved as PSD0. At the next time t1, same procedure may be repeated to obtain the smoothed PSD as PSD1. Then cross-correlation may be performed between PSD0 and PSD1. From the cross-correlation result, the peak value (in y axis) as well as the position p1 (in x axis) may be determined. Based on the peak position shift (e.g., difference), the Doppler estimation (frequency shift) may be deduced. The peak position shift may be calculated as the difference between the peak position and a reference position.

For example in FIG. 6, it can be noted that p1=120938. The window to collect samples for FFT is 0.1 s, so that the FFT resolution may be 10 Hz. The sampling frequency may be 1.2 Mhz; and 120,001 samples may be used for FFT. The position 120001 on the cross-correlation plot may correspond to zero-point difference. The position 120938 may have 937 points of difference (that is, 120938−120001=937). Since the FFT or PSD resolution is 10 Hz, frequency difference between t0 and t1 may be 9370 Hz (that is, 937×FFT resolution=9370).

From the procedure listed in FIG. 6, it should be noted that the cross-correlation may not require the carrier frequency or the waveform of the EMI sources, which make such approach to be a blind detection algorithm.

According to various embodiments of the present disclosure, ionosphere compensation is described in detail hereinafter. Uplink EMI signals may be disturbed by atmospheric effect on the path between the EMI transmitter and the satellite receiver antenna. It is expected that the ionosphere has a minor effect on the EMI signals when the ionosphere is quiet. However, anomalies and perturbations may be in the structure of the ionosphere with respect to the geomagnetic field and solar activity, and such conditions may further affect the EMI signals.

Figure 7:
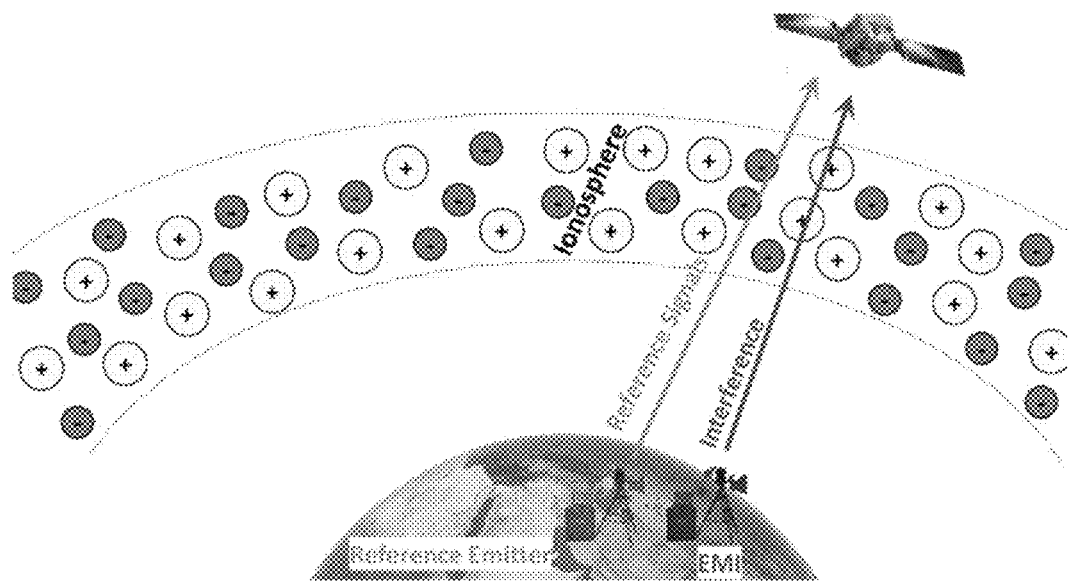
FIG. 7 depicts an exemplary ionospheric effect on the SSG according to various disclosed embodiments of the present disclosure.

FIG. 7 depicts an exemplary ionospheric effect on the SSG according to various disclosed embodiments of the present disclosure. As illustrated in FIG. 7, free electrons in the ionosphere layer may affect the RF signals and cause varying propagation delays. According to various embodiments of the present disclosure, to improve the SSG performance, an online ionosphere estimation may be used to compensate for the ionosphere with help of reference emitters.

The ionospheric delay $I_f$ (at the frequency f) in meter may be defined as follows:

$$I_f = \alpha_f \times STEC, \quad (2)$$

where $$\alpha_f = \frac{40.3 \times 10^{16}}{f^2}$$

in meter/TECU; and the total electron content unit (TECU) may be defined as $10^{16}$ electrons/m². The slant total electron content (STEC) may be defined as follows:

$$STEC = \int_s N_s ds \quad (3)$$

where $N_s$ is the electron density (electrons/m³), and s is the path through the ionosphere layer. Typical values of the RF bands of interest are listed in Table 2. Table 1 illustrates typical ionosphere values with STEC=100 TECU. It can be seen from Table 1 that for frequencies below the X band, the ionospheric delay may be sufficient to affect the SSG performance.

TABLE 2

| RF Band | $\alpha_f$ (meter/TECU) | $I_f$ (meter) |
| --- | --- | --- |
| UHF (320 MHz) | 3.9355 | 393.55 |
| L Band (1.6 GHz) | 0.1574 | 15.74 |
| C Band (6 GHz) | 0.0112 | 1.12 |
| X Band (8.2 GHz) | 0.0060 | 0.6 |
| Ku (16.6 GHz) | 0.0015 | 0.15 |
| K (22.4 GHz) | 0.0008 | 0.08 |
| Ka (34.8 GHz) | 0.0003 | 0.03 |

Figure 8A:
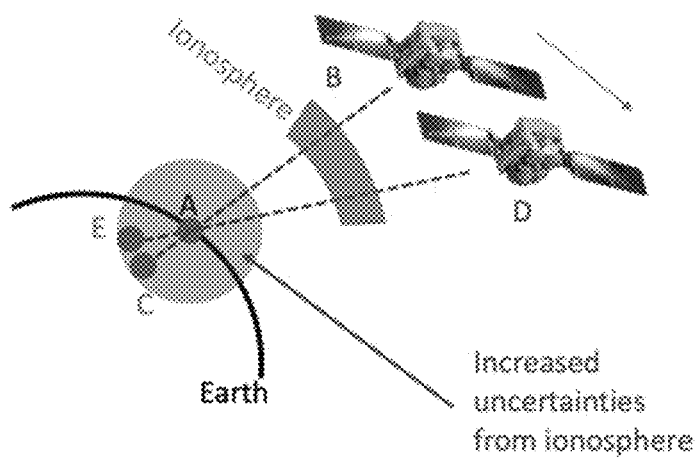
FIG. 8A depicts an exemplary ionospheric effect on Doppler estimation for a constant ionosphere layer according to various disclosed embodiments of the present disclosure.
Figure 8B:
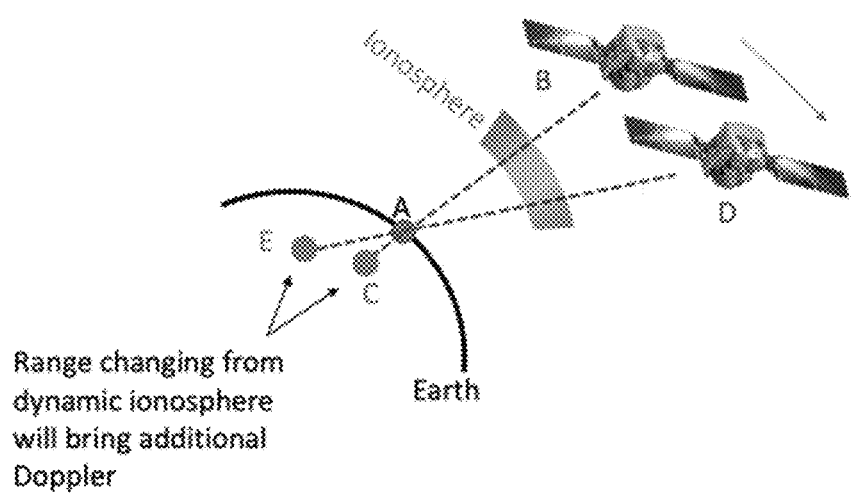
FIG. 8B depicts an exemplary ionospheric effect on Doppler estimation for a dynamically changing ionosphere according to various disclosed embodiments of the present disclosure.

For the SSG scenario, the ionosphere may affect the Doppler estimation in two ways as the following. FIG. 8A depicts an exemplary ionospheric effect on Doppler estimation for a constant ionosphere layer according to various disclosed embodiments of the present disclosure; and FIG. 8B depicts an exemplary ionospheric effect on Doppler estimation for a dynamically changing ionosphere according to various disclosed embodiments of the present disclosure. Referring to FIGS. 8A-8B, A denotes true EMI position; B and D denote satellite positions at different time; and C and E denote corresponding ghost EMI with ionosphere delays. Uncertainty of the Doppler estimation (FIG. 8A) even for a constant ionosphere layer may be increased. Additional Doppler shift (FIG. 8B) for a dynamically changing ionosphere layer may be incurred.

With the assistance of the ERE, the online ionosphere estimation may be used according to various embodiments of the present disclosure. The online ionosphere estimation may include three following exemplary steps: estimating the ionospheric delay for the ERE: $\hat{I}_f = (t_1 - t_0)c - |P_r - P_s|$, where $t_1$ is receiving time at the satellite, $t_0$ is transmitting time at the ERE, $P_r$ is the position of ERE, and $P_s$ is the position of the satellite; estimating the STEC using $$\widehat{STEC} = \frac{\hat{I}_f}{\alpha_f};$$

and estimating the ionospheric delay for EMI using $\hat{I}_{EMI}$ $\widehat{STEC}$, where $\alpha_{EMI}$ denotes the value of $\alpha_f$ when f is the EMI frequency. Since the ERE is nearby the EMI, same estimated STEC may be used according to embodiments of the present disclosure.

Figure 9:
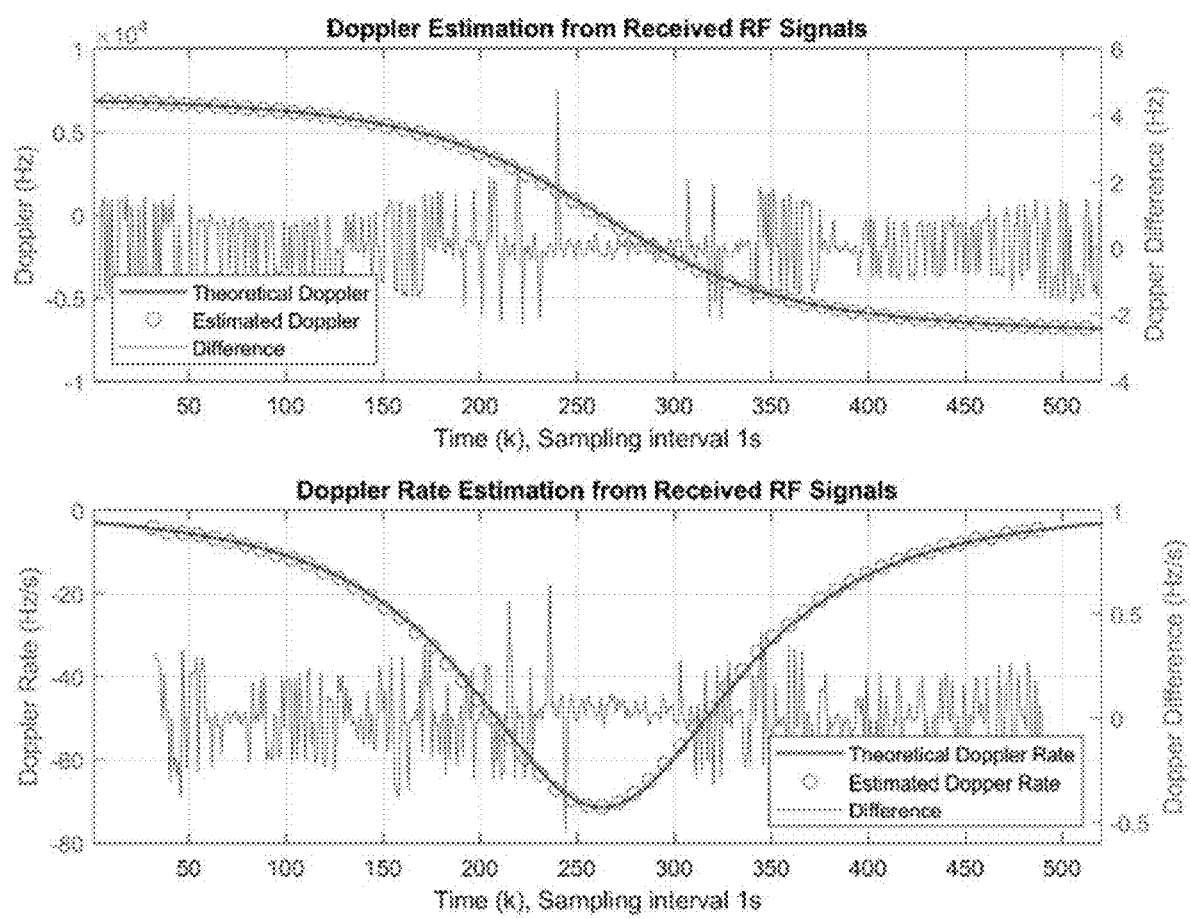
FIG. 9 depicts Doppler estimation and Doppler rate estimation for a UHF (ultra-high frequency) band frequency according to various disclosed embodiments of the present disclosure.
Figure 10:
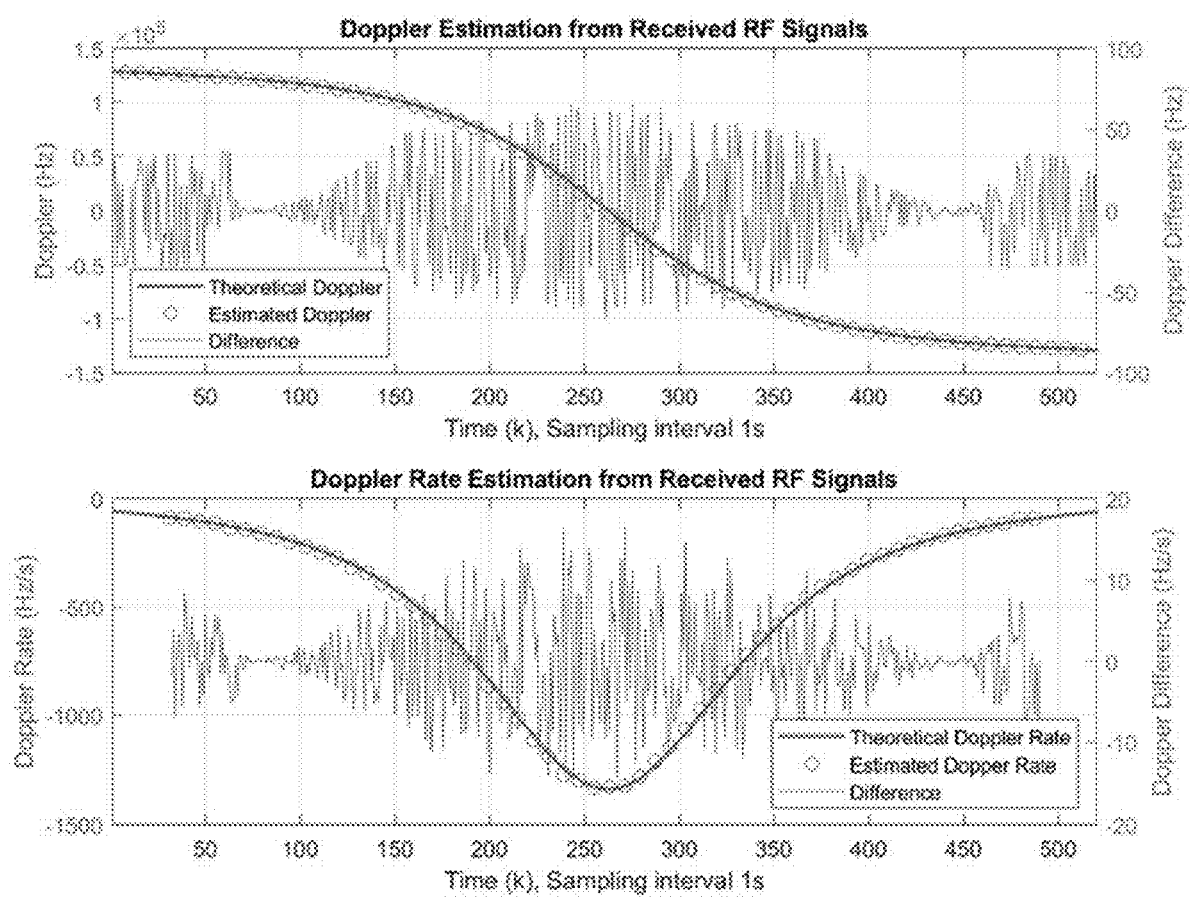
FIG. 10 depicts Doppler estimation and Doppler rate estimation for a C band frequency according to various disclosed embodiments of the present disclosure.
Figure 11:
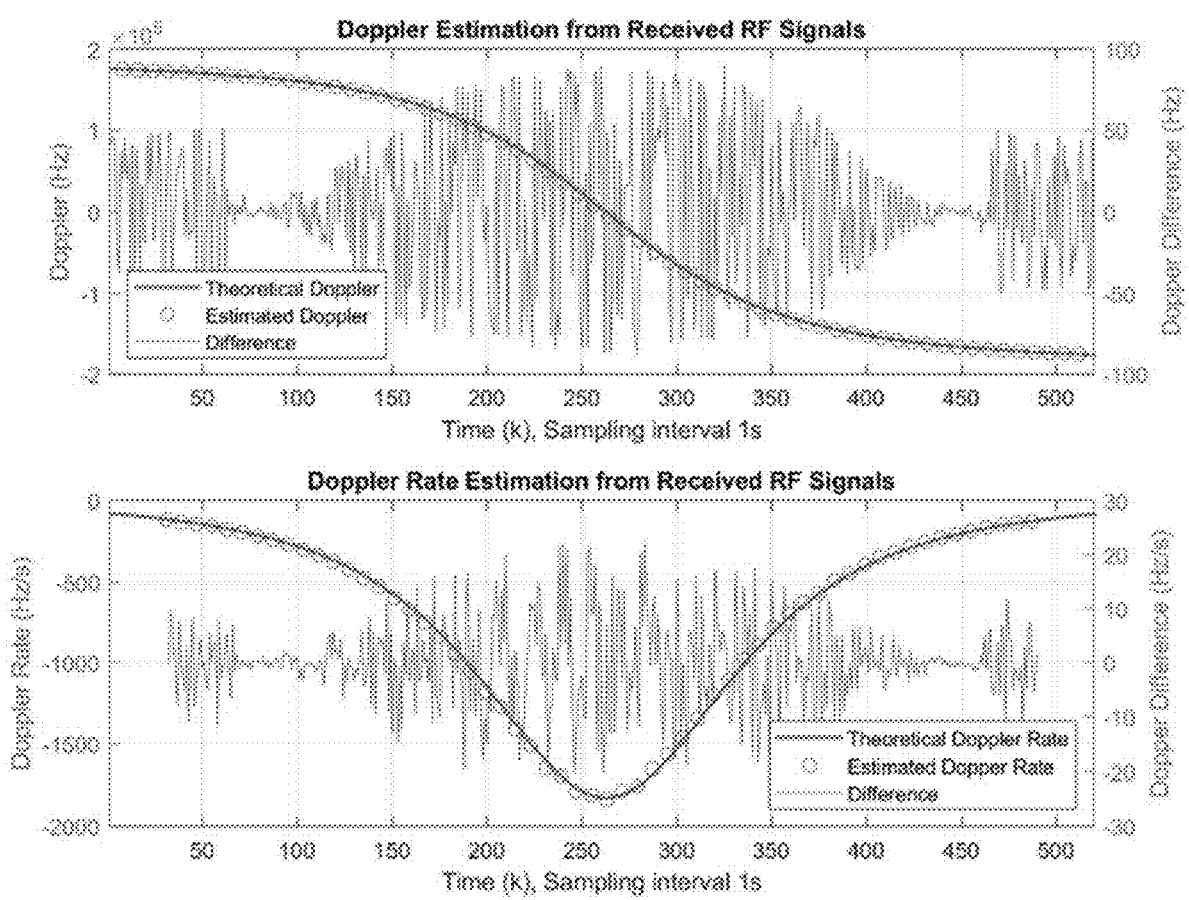
FIG. 11 depicts Doppler estimation and Doppler rate estimation for a X band frequency according to various disclosed embodiments of the present disclosure.

Doppler estimation results with the priori information is described in detail herein. For UHF band carrier frequency $f_c$=320 MHz, SNR=−2 dB, QPSK (quadrature phase shift keying) modulation, a sampling frequency $f_s$=1 Mhz, and $f_{IF}$=100 kHz, following Doppler estimation results obtained are shown in FIG. 9, where theoretical values may be calculated using equation (1). FIG. 9 depicts Doppler estimation and Doppler rate estimation for a UHF band frequency according to various disclosed embodiments of the present disclosure. Similarly, Doppler estimation results for C and X bands obtained are shown in FIGS. 10-11, respectively. FIG. 10 depicts Doppler estimation and Doppler rate estimation for a C band frequency according to various disclosed embodiments of the present disclosure. FIG. 11 depicts Doppler estimation and Doppler rate estimation for a X band frequency according to various disclosed embodiments of the present disclosure. The SNR levels may be set to −2 dB in embodiments of the present disclosure.

Figure 12:
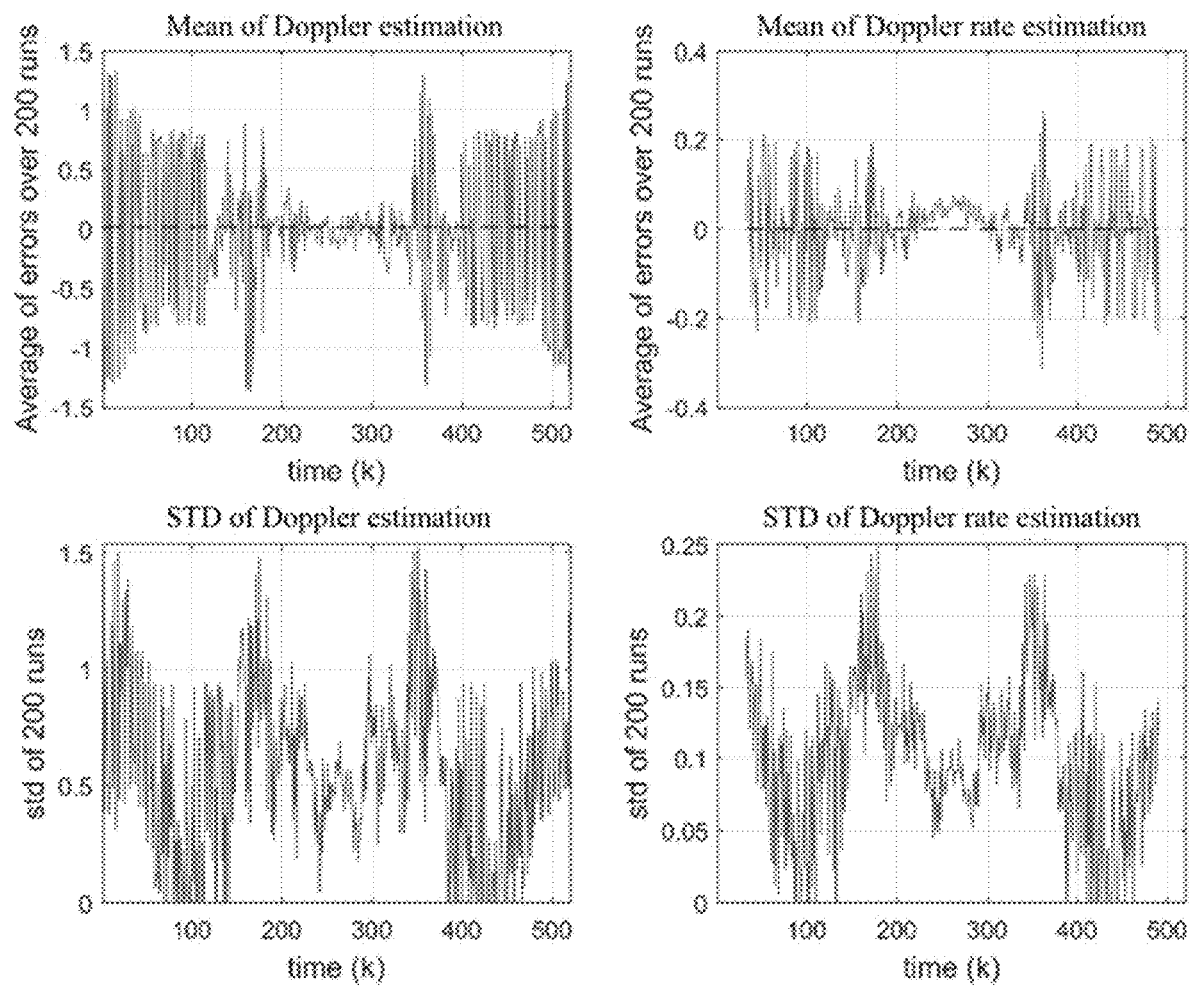
FIG. 12 depicts statistics of Doppler estimation and Doppler rate estimation for a UHF band frequency according to various disclosed embodiments of the present disclosure.
Figure 13:
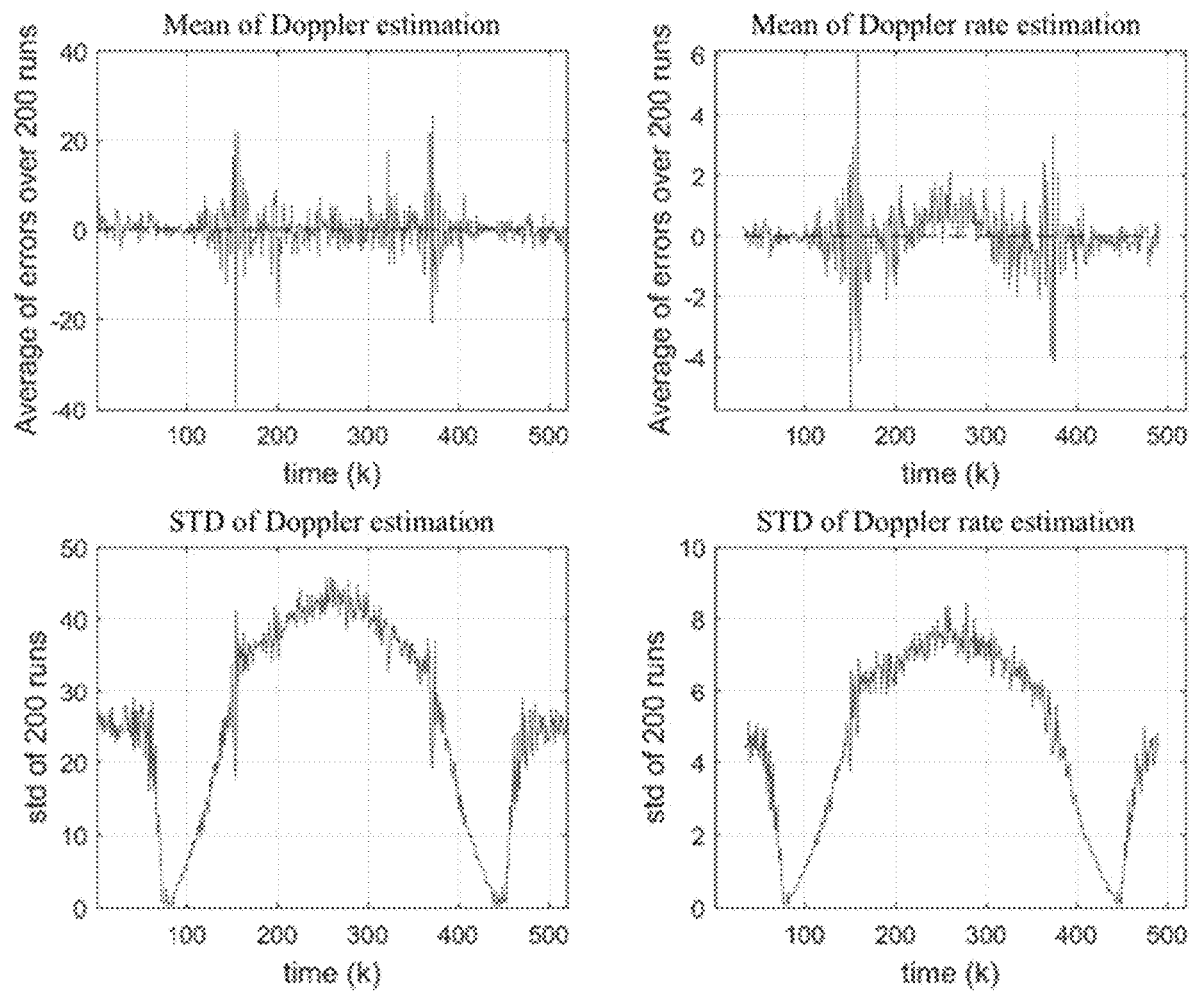
FIG. 13 depicts statistics of Doppler estimation and Doppler rate estimation for a C band frequency according to various disclosed embodiments of the present disclosure.
Figure 14:
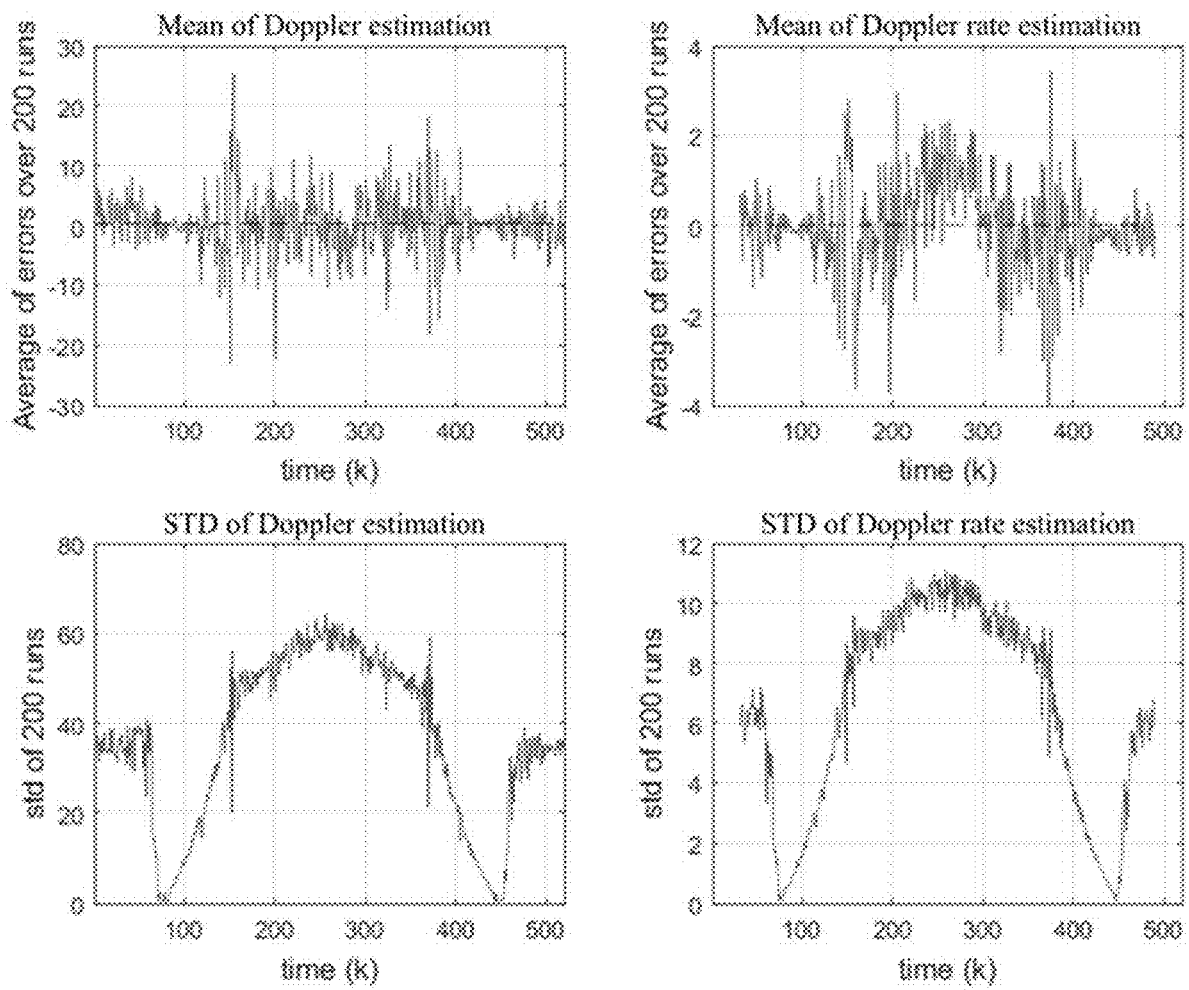
FIG. 14 depicts statistics of Doppler estimation and Doppler rate estimation for an X band frequency according to various disclosed embodiments of the present disclosure.

FIG. 12 depicts statistics of Doppler estimation and Doppler rate estimation for a UHF band frequency according to various disclosed embodiments of the present disclosure. FIG. 13 depicts statistics of Doppler estimation and Doppler rate estimation for a C band frequency according to various disclosed embodiments of the present disclosure. FIG. 14 depicts statistics of Doppler estimation and Doppler rate estimation for an X band frequency according to various disclosed embodiments of the present disclosure. Since the UKF needs the covariance of the Doppler estimation, 200 runs may be simulated for each case, and the statistics of the Doppler estimation may be obtained, which are shown in FIGS. 12-14, for UHF, C and X bands, respectively in embodiments of the present disclosure.

According to various embodiments of the present disclosure, above-mentioned results show that the estimation approach may be unbiased; and the standard deviation (STD or std) values may increase along the carrier frequency. The maximum STD values are [1.54, 0.248] for UHF, [45.88, 8.43] for C band, and [64.30, 11.05] for X band, where the first number in the brackets is for Doppler, and the second number in the brackets is for Doppler rate. Such numbers may be used to set up the unscented Kalman filter for SSG.

The accuracy of the estimation approach may depend on the SNR level, the FFT points, the carrier frequency, and the M value of the MPSK modulation. For QPSK (M=4), the lowest SNR may be around −2 dB. The Doppler estimation resolution may be $$\frac{1 \text{ Mhz}}{0.4 \times 1 \text{ Mhz} \times 4} = 0.625 \text{ Hz},$$

where 0.4 s (window size)×1 M (sampling frequency) may be the points used in the FFT.

Figure 15:
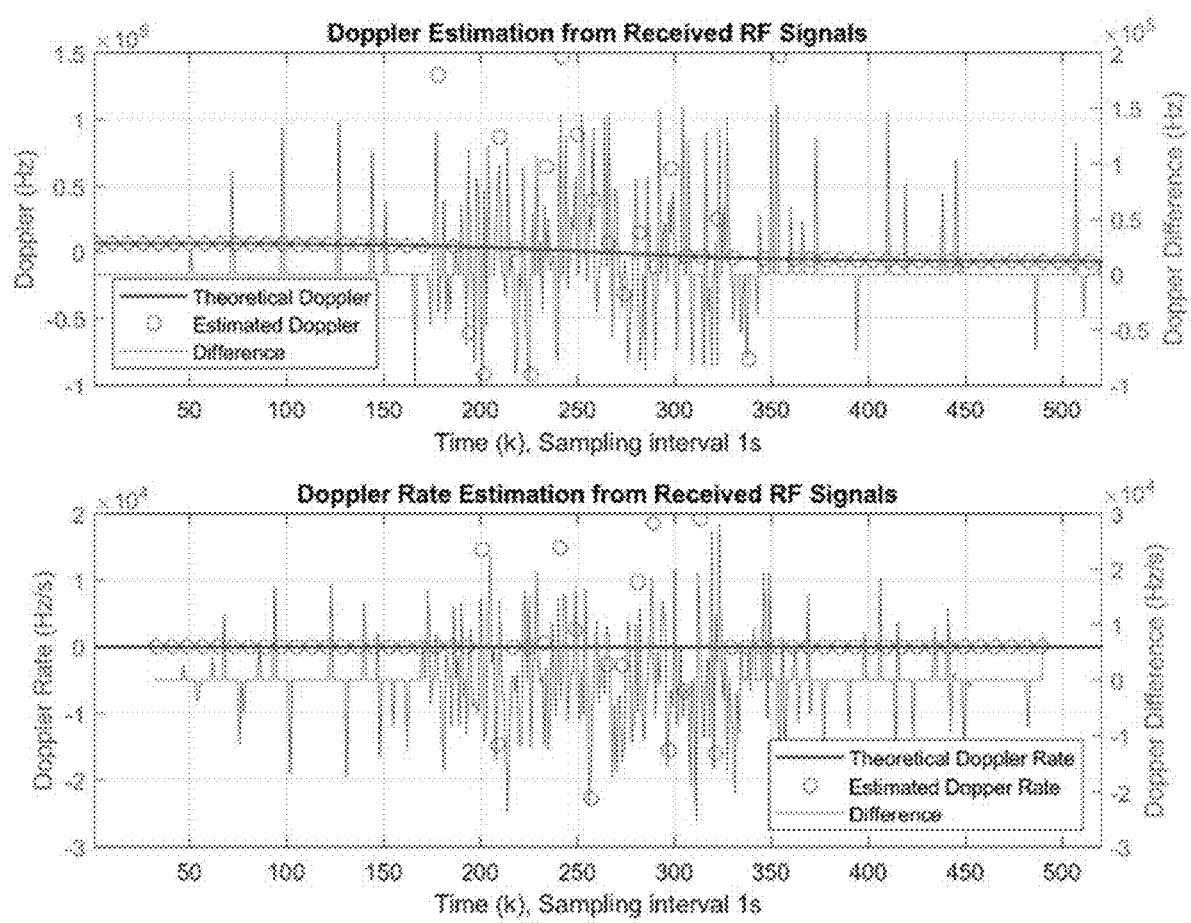
FIG. 15 depicts estimation results for SNR=−5 dB according to various disclosed embodiments of the present disclosure.

When the SNR is below −2 dB, the peak in step 2 may behave wildly. The estimation results for −5 dB are shown in FIG. 15. Exemplarily, such simulation may be set up as follows:

fc = 320e6; % sampling frequency fIF = 100e3; % 1 MHz intermediate frequency

-continued fs = 1e6; % sampling frequency twin = 0.4; % window size of FFT myrx = awqn(myrx, −5, 'measured'); % − 5 dB myrx is received signal However, poor performance in low SNR may not be a problem, because when the SNR<−2 dB for EMI sources, it may indicate that the SNR>2 dB for SATCOM. Typically, modern SATCOM system may work for SNR>2 dB, which may indicate that the EMI or jamming have no effect.

Figure 16:
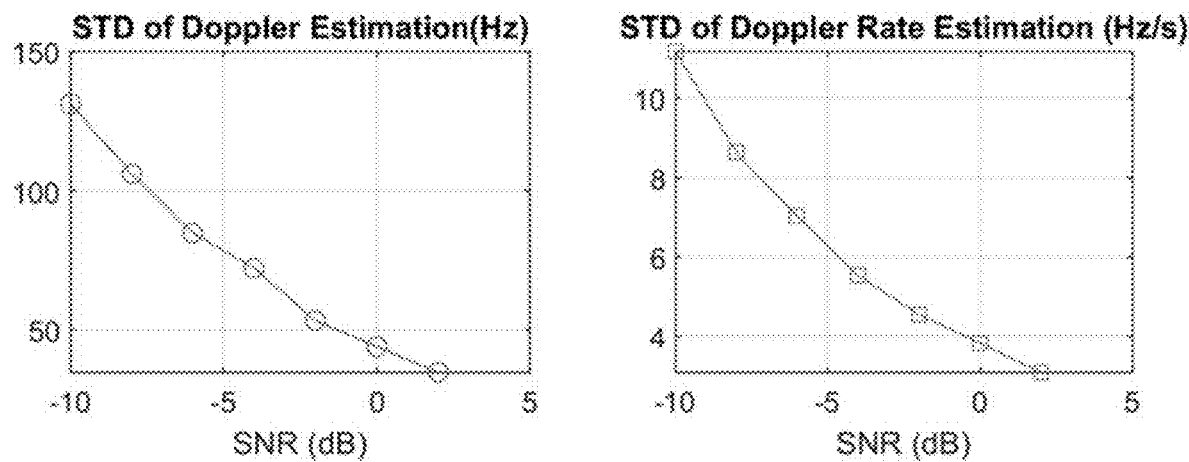
FIG. 16 depicts standard deviation (STD) of Doppler estimation and Doppler rate estimation of a UHF band of 320 MHz according to various disclosed embodiments of the present disclosure.
Figure 17:
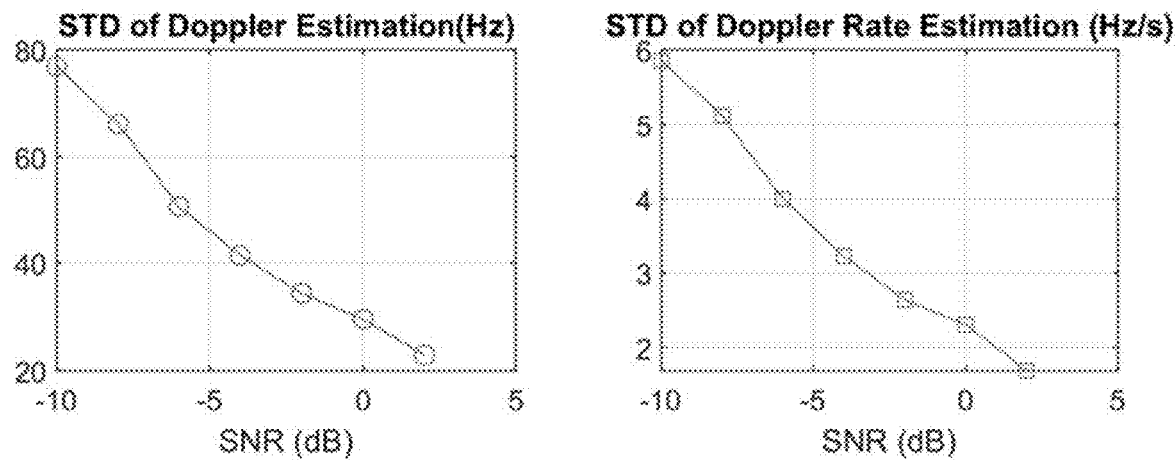
FIG. 17 depicts standard deviation (STD) of Doppler estimation and Doppler rate estimation of a C band of 6 GHz according to various disclosed embodiments of the present disclosure.
Figure 18:
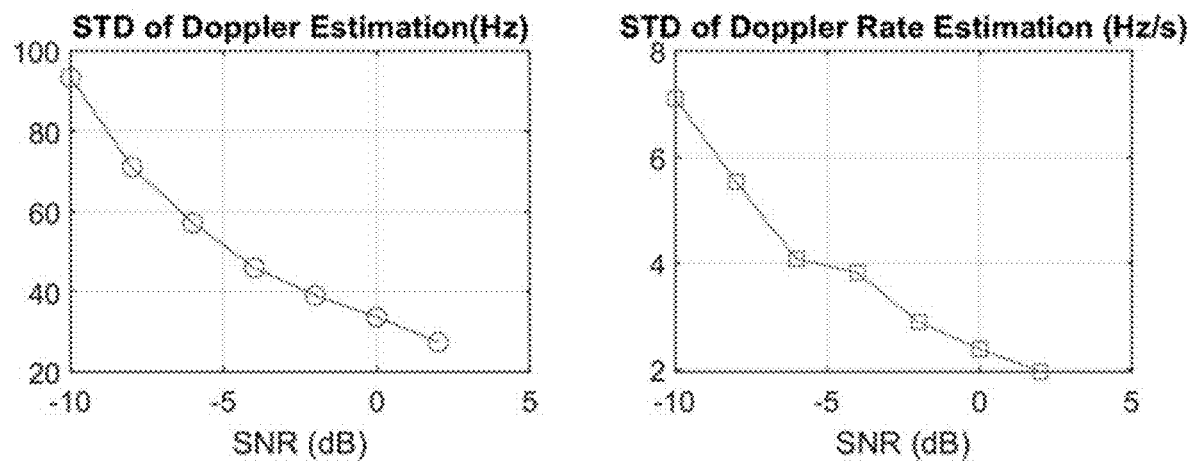
FIG. 18 depicts standard deviation (STD) of Doppler estimation and Doppler rate estimation of an X band of 8.2 GHz according to various disclosed embodiments of the present disclosure.
Figure 19:
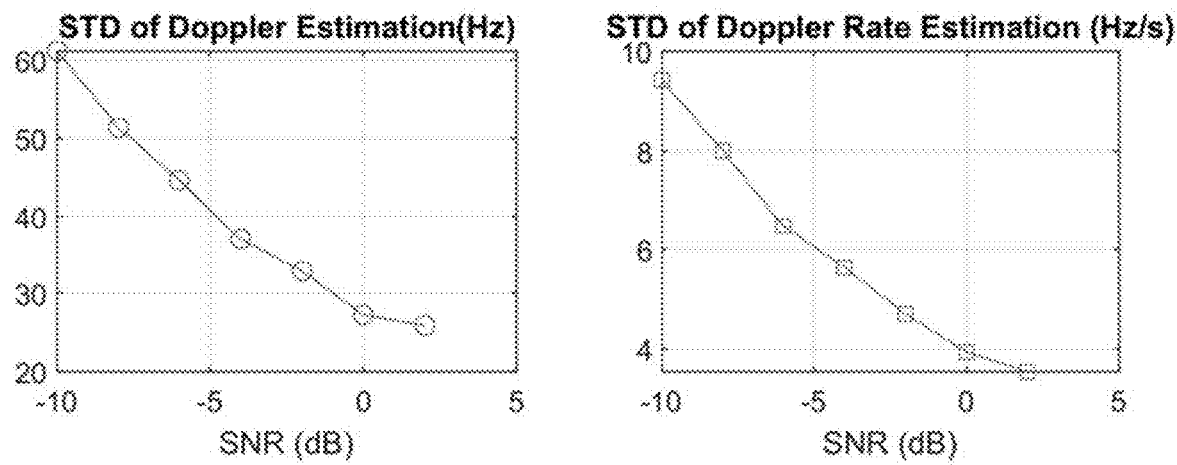
FIG. 19 depicts standard deviation (STD) of Doppler estimation and Doppler rate estimation of a Ku band of 16.6 GHz according to various disclosed embodiments of the present disclosure.

The blind detection may be tested on various RF bands and SNR settings. Corresponding results are shown in FIGS. 16-19 and summarized in Table 2. FIG. 16 depicts STD of Doppler estimation and Doppler rate estimation of a UHF band of 320 MHz according to various disclosed embodiments of the present disclosure. FIG. 17 depicts STD of Doppler estimation and Doppler rate estimation of a C band of 6 GHz according to various disclosed embodiments of the present disclosure. FIG. 18 depicts STD of Doppler estimation and Doppler rate estimation of an X band of 8.2 GHz according to various disclosed embodiments of the present disclosure. FIG. 19 depicts STD of Doppler estimation and Doppler rate estimation of a Ku band of 16.6 GHz according to various disclosed embodiments of the present disclosure. Table 3 illustrates estimated Doppler shifts for different SNR and RF bands, where the performance is denoted by two standard deviation (STD) values: [STD of Doppler shift, STD of Doppler rate]. For example, at SNR −10 and for C band (6 GHz), the STD of Doppler shift may be 76.91 Hz, and the STD of Doppler rate may be 5.85 Hz/s. Compared with the method with the priori information, the cross-correlation based method may be suitable for low SNR situations (cases).

TABLE 4

| SNR | UHF (320 MHz) | C Band (6 GHz) | X Band (8.2 GHz) | Ku Band (16.6 GHz) |
|---|---|---|---|---|
| −10 | [131.34, 11.17] | [76.91, 5.85] | [93.37, 7.10] | [61.13, 9.42] |
| −8 | [1.0624, 8.65] | [66.20, 5.11] | [71.10, 5.53] | [51.37, 8.00] |
| −6 | [84.72, 7.03] | [50.69, 4.00] | [57.22, 4.08] | [44.62, 6.47] |
| −4 | [72.22, 5.53] | [41.44, 3.22] | [45.97, 3.82] | [37.02, 5.63] |
| −2 | [53.33, 4.54] | [34.35, 2.63] | [39.10, 2.88] | [32.85, 4.69] |
| 0 | [43.99, 3.82] | [29.50, 2.29] | [33.56, 2.37] | [27.24, 3.92] |
| 2 | [35.01, 3.11] | [22.83, 1.69] | [27.36, 1.95] | [25.88, 3.53] |

Figure 20:
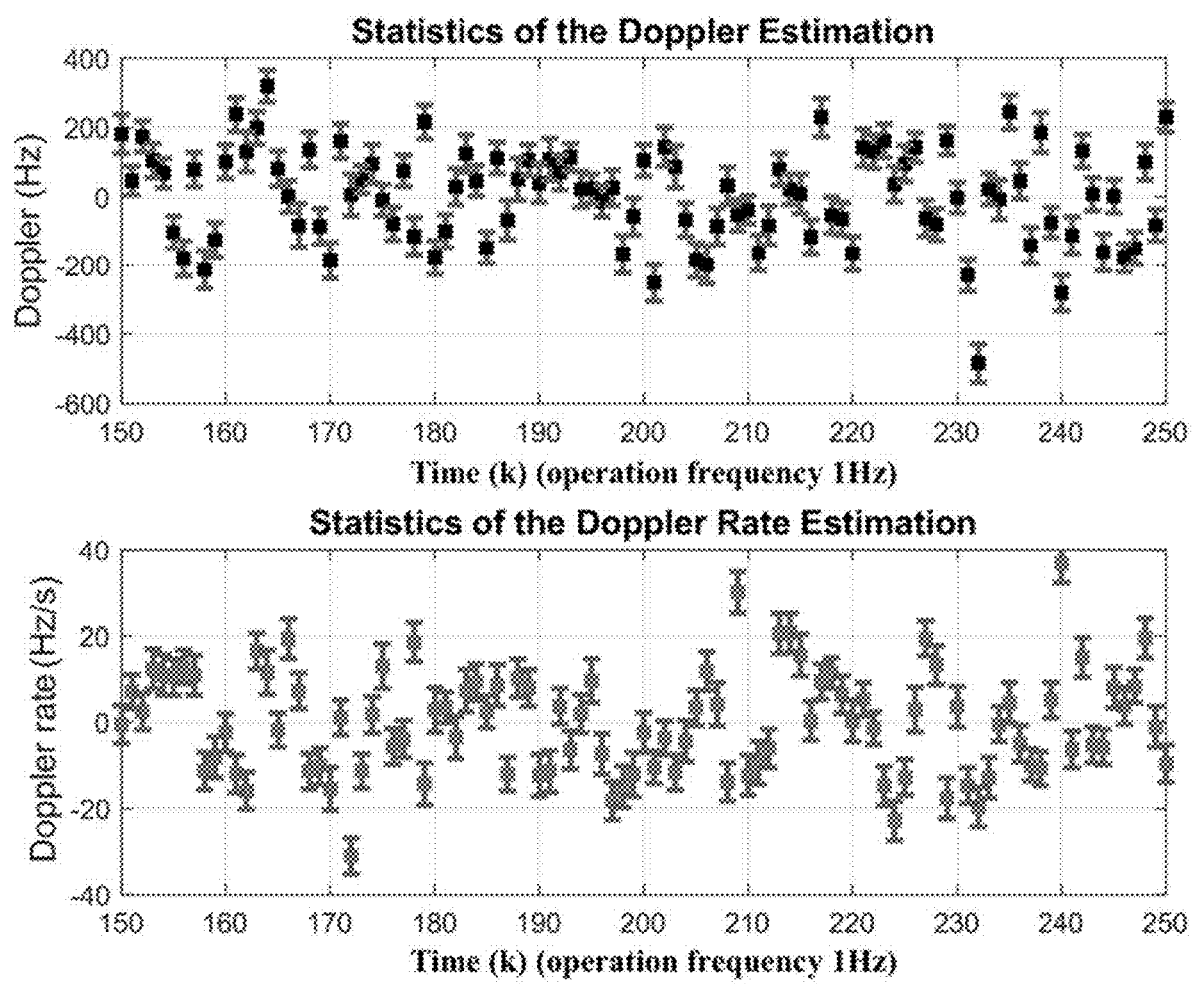
FIG. 20 depicts Doppler estimation and Doppler rate estimation with ionosphere compensation according to various disclosed embodiments of the present disclosure.
Figure 21:
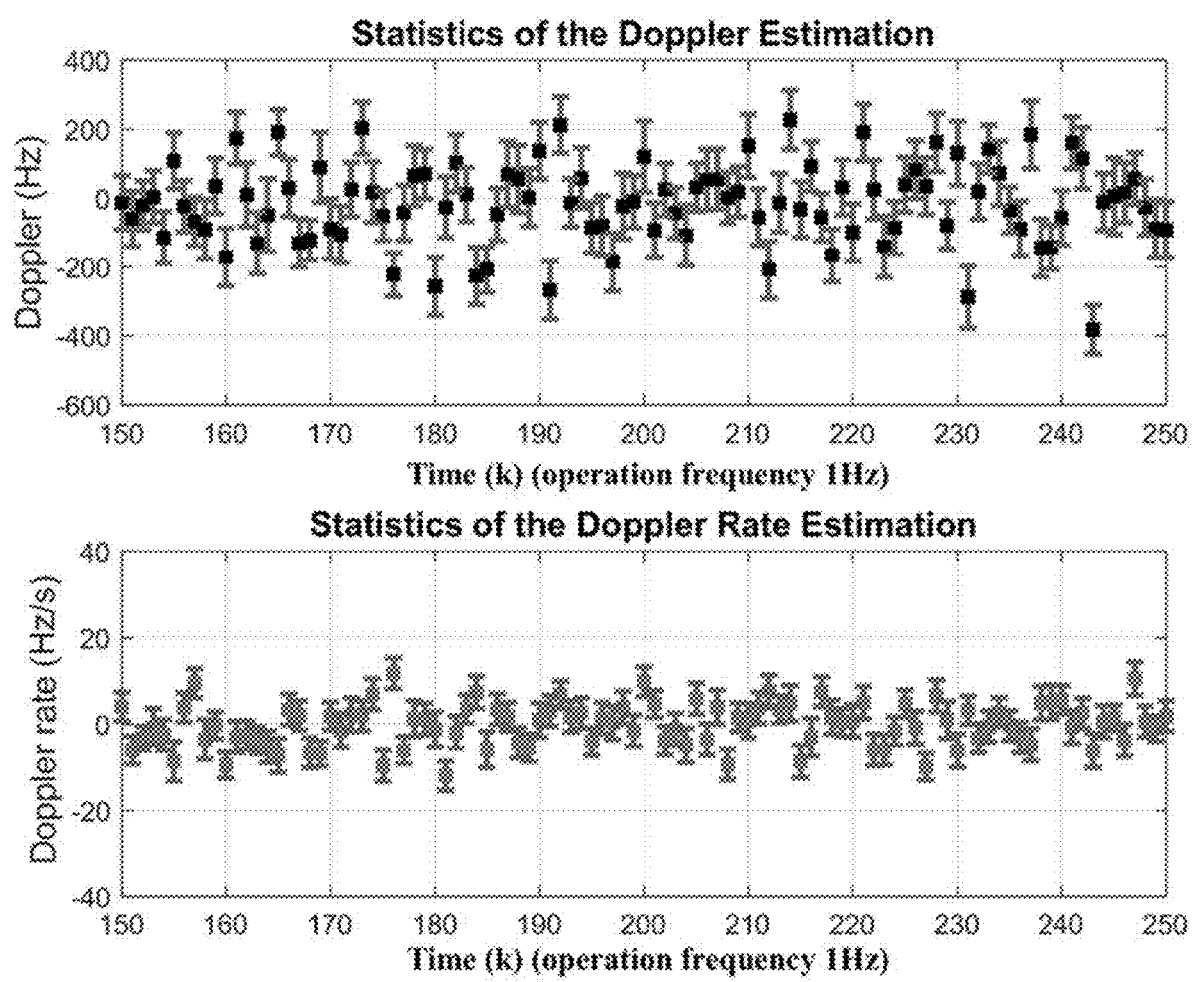
FIG. 21 depicts Doppler estimation and Doppler rate estimation without ionosphere compensation according to various disclosed embodiments of the present disclosure.
Figure 22:
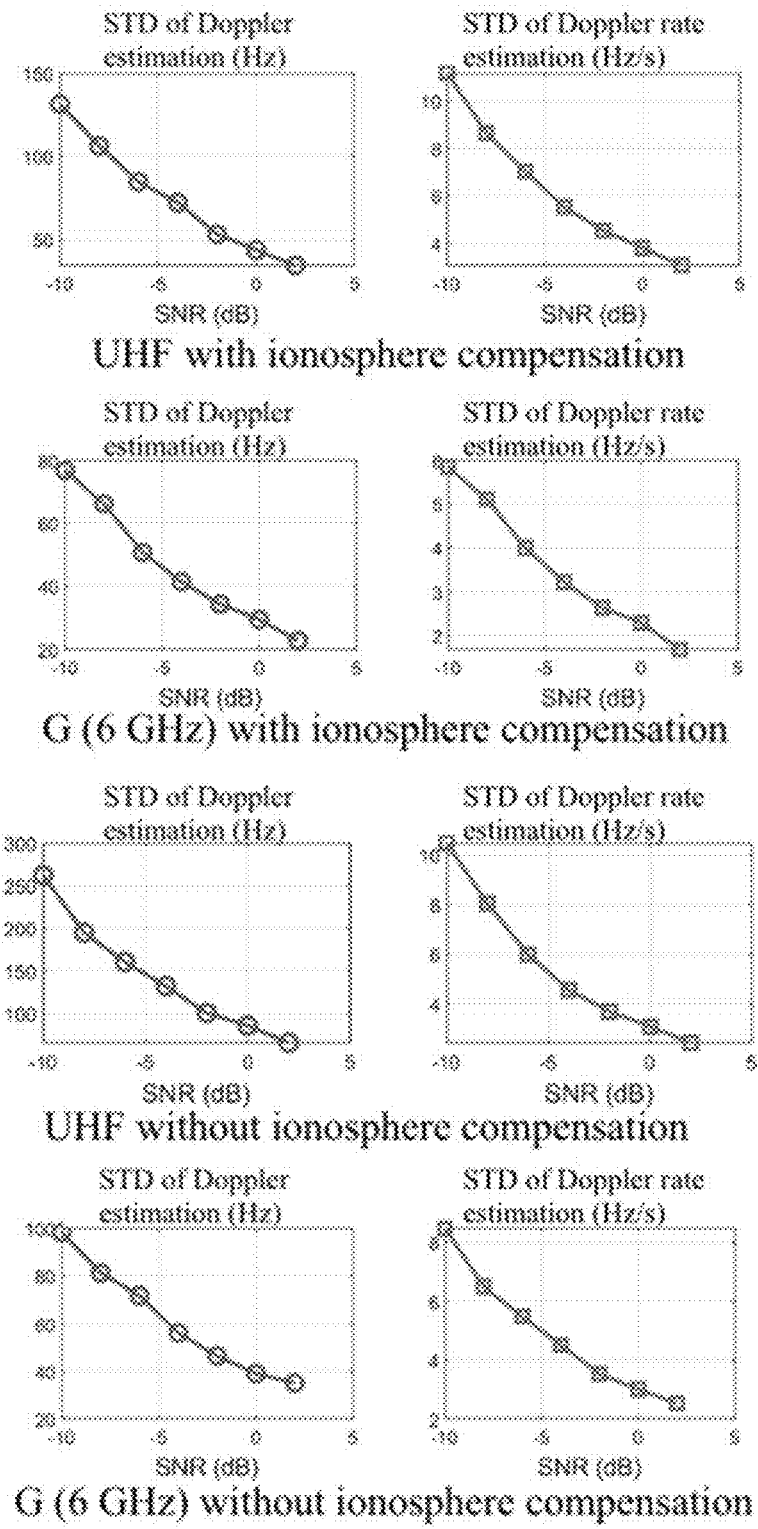
FIG. 22 depicts comparison of Doppler estimation and Doppler rate estimation for various SNR levels according to various disclosed embodiments of the present disclosure.

Given the UHF band (320 MHz) at SNR=−4 dB, the results of Doppler estimation for two cases, including ionosphere compensation and without ionosphere compensation, may be obtained. That is, the first case is for ionosphere compensation; and the second case is for without ionosphere compensation. FIG. 20 depicts Doppler estimation and Doppler rate estimation with ionosphere compensation according to various disclosed embodiments of the present disclosure. FIG. 21 depicts Doppler estimation and Doppler rate estimation without ionosphere compensation according to various disclosed embodiments of the present disclosure. The result of the first case is shown in FIG. 20, where 200 trials may be used to calculate the statistics (error bars includes means and standard deviations); and the results of the second case is shown in FIG. 21. FIG. 22 depicts comparison of Doppler estimation and Doppler rate estimation for various SNR levels according to various disclosed embodiments of the present disclosure. The results of different SNR levels for with ionosphere compensation and without ionosphere compensation are summarized in FIG. 22. By comparing FIGS. 20-21, improved Doppler estimation with ionosphere compensation may be seen according to embodiments of the present disclosure.

Various embodiments of the present disclosure provide a system for blind EMI Doppler estimation from a SSG system. The system includes a memory, configured to store program instructions for performing a method for passive SSG of ground-based EMI sources; and a processor, coupled with the memory and, when executing the program instructions, configured for: at a first time, calculating a power spectral density (PSD) of a received signal; smoothing the PSD of the received signal using moving window average, and saving the smoothed PSD of the received signal as PSD0; at a next time, calculating a PSD of another received signal; smoothing the PSD of the another received signal using moving window average, and saving the smoothed PSD of the another received signal as PSD1; performing cross correlation between PSD0 and PSD1 to obtain a cross-correlation result; determining a peak position from the cross-correlation result; and obtaining a Doppler estimation based on a peak position shift between the peak position and a reference position.

Various embodiments of the present disclosure provide a non-transitory computer-readable storage medium, containing program instructions for, when being executed by a processor, performing a cross-correlation based method for blind EMI Doppler estimation from a SSG system. The method includes at a first time, calculating a power spectral density (PSD) of a received signal; smoothing the PSD of the received signal using moving window average, and saving the smoothed PSD of the received signal as PSD0; at a next time, calculating a PSD of another received signal; smoothing the PSD of the another received signal using moving window average, and saving the smoothed PSD of the another received signal as PSD1; performing cross correlation between PSD0 and PSD1 to obtain a cross-correlation result; determining a peak position from the cross-correlation result; and obtaining a Doppler estimation based on a peak position shift between the peak position and a reference position.

The embodiments disclosed herein may be exemplary only. Other applications, advantages, alternations, modifications, or equivalents to the disclosed embodiments may be obvious to those skilled in the art and be intended to be encompassed within the scope of the present disclosure.

What is claimed is:

1. A cross-correlation based method for blind electromagnetic interference (EMI) Doppler estimation from a single satellite geolocation (SSG) system, comprising:
at a first time, calculating a power spectral density (PSD) of a received signal; smoothing the PSD of the received signal using a moving window average approach, and saving the smoothed PSD of the received signal as PSD0;

at a next time, calculating a PSD of another received signal; smoothing the PSD of the another received signal using the moving window average approach, and saving the smoothed PSD of the another received signal as PSD1;

performing cross-correlation between PSD0 and PSD1 to obtain a cross-correlation result;

determining a peak position from the cross-correlation result; and obtaining a Doppler estimation based on a peak position shift between the peak position and a reference position.

2. The method according to claim 1, wherein:
Doppler rate estimation is calculated according to the obtained Doppler estimation.

3. The method according to claim 2, wherein performing an online ionosphere estimation includes:
estimating an ionospheric delay for an enhanced reference emitter (ERE); estimating slant total electron content (STEC) using the ionospheric delay for the ERE; and estimating an ionospheric delay for an EMI source using the STEC.

4. The method according to claim 3, wherein:
the ERE has dual operation modes which include an offline mode and an online mode, wherein the ERE is configured to mimic the EMI source at the offline mode and compensate the ionospheric delay at the online mode.

5. The method according to claim 1, wherein:
before calculating the PSD of the received signal, the method further includes performing fast Fourier transform (FFT) on the received signal; and/or
before calculating the PSD of the another received signal, the method further includes performing fast Fourier transform (FFT) on the another received signal.

6. A system, comprising:
a memory, configured to store program instructions for performing a cross-correlation based method for blind electromagnetic interference (EMI) Doppler estimation from a single satellite geolocation (SSG) system; and
a processor, coupled with the memory and, when executing the program instructions, configured for:
at a first time, calculating a power spectral density (PSD) of a received signal;
smoothing the PSD of the received signal using moving window average, and saving the smoothed PSD of the received signal as PSD0;
at a next time, calculating a PSD of another received signal; smoothing the PSD of the another received signal using moving window average, and saving the smoothed PSD of the another received signal as PSD1;
performing cross-correlation between PSD0 and PSD1 to obtain a cross-correlation result;
determining a peak position from the cross-correlation result; and
obtaining a Doppler estimation based on a peak position shift between the peak position and a reference position.

7. The system according to claim 6, wherein:
Doppler rate estimation is calculated according to the obtained Doppler estimation.

8. The system according to claim 7, wherein for performing an online ionosphere estimation, the processor is configured to:

estimate an ionospheric delay for an enhanced reference emitter (ERE); estimate slant total electron content (STEC) using the ionospheric delay for the ERE; and estimate an ionospheric delay for an EMI source using the STEC.

9. The system according to claim 8, wherein:
the ERE has dual operation modes which include an offline mode and an online mode, wherein the ERE is configured to mimic the EMI source at the offline mode and compensate the ionospheric delay at the online mode.

10. The system according to claim 6, wherein:
before calculating the PSD of the received signal, the processor is configured to perform fast Fourier transform (FFT) on the received signal; and/or
before calculating the PSD of the another received signal, the processor is configured to perform fast Fourier transform (FFT) on the another received signal.

11. A non-transitory computer-readable storage medium, containing program instructions for, when being executed by a processor, performing a cross-correlation based method for blind electromagnetic interference (EMI) Doppler estimation from a single satellite geolocation (SSG) system, the method comprising:
at a first time, calculating a power spectral density (PSD) of a received signal; smoothing the PSD of the received signal using moving window average, and saving the smoothed PSD of the received signal as PSD0;
at a next time, calculating a PSD of another received signal; smoothing the PSD of the another received signal using moving window average, and saving the smoothed PSD of the another received signal as PSD1;
performing cross-correlation between PSD0 and PSD1 to obtain a cross-correlation result;
determining a peak position from the cross-correlation result; and
obtaining a Doppler estimation based on a peak position shift between the peak position and a reference position.

12. The storage medium according to claim 11, wherein:
Doppler rate estimation is calculated according to the obtained Doppler estimation.

13. The storage medium according to claim 12, wherein for performing an online ionosphere estimation, the processor is configured to:
estimate an ionospheric delay for an enhanced reference emitter (ERE); estimate slant total electron content (STEC) using the ionospheric delay for the ERE; and estimate an ionospheric delay for an EMI source using the STEC.

14. The storage medium according to claim 13, wherein:
the ERE has dual operation modes which include an offline mode and an online mode, wherein the ERE is configured to mimic the EMI source at the offline mode and compensate the ionospheric delay at the online mode.

15. The storage medium according to claim 11, wherein:
before calculating the PSD of the received signal, the processor is configured to perform fast Fourier transform (FFT) on the received signal; and/or
before calculating the PSD of the another received signal, the processor is configured to perform fast Fourier transform (FFT) on the another received signal.

* * * * *